TWO-WAY DATA COMPARE-SORT APPARATUS

Filed Jan. 2, 1959 4 Sheets-Sheet 1

INVENTORS.
PHILIP N. ARMSTRONG,
ELMER E. JUNGCLAS, JR.,
GEORGE WOLFE, JR.,
BY Robert H. Himes
ATTORNEY May 16, 1961 P. N. ARMSTRONG ET AL 2,984,824

TWO-WAY DATA COMPARE-SORT APPARATUS

Filed Jan. 2, 1959

4 Sheets-Sheet 2

INVENTORS.
PHILIP N. ARMSTRONG,
ELMER E. JUNGCLAS, JR.,
GEORGE WOLFE, JR.,
BY Robert H. Himes
ATTORNEY May 16, 1961 P. N. ARMSTRONG ET AL 2,984,824

TWO-WAY DATA COMPARE-SORT APPARATUS

Filed Jan. 2, 1959

4 Sheets-Sheet 3

INVENTORS.
PHILIP N. ARMSTRONG,
ELMER E. JUNGCLAS, JR.,
GEORGE WOLFE, JR.,

BY Robert H. Himes

ATTORNEY

May 16, 1961 P. N. ARMSTRONG ET AL 2,984,824

TWO-WAY DATA COMPARE-SORT APPARATUS

Filed Jan. 2, 1959 4 Sheets-Sheet 4

INVENTORS.
PHILIP N. ARMSTRONG,
ELMER E. JUNGCLAS, JR.,
GEORGE WOLFE, JR.,
BY
Robert H. Himes
ATTORNEY.

United States Patent Office 2,984,824
Patented May 16, 1961

2,984,824

TWO-WAY DATA COMPARE-SORT APPARATUS

Philip N. Armstrong, Santa Monica, Elmer E. Jungclas, Jr., Garden Grove, and George Wolfe, Jr., La Mirada, Calif., assignors to Hughes Aircraft Company, Culver City, Calif., a corporation of Delaware Filed Jan. 2, 1959, Ser. No. 784,493

12 Claims. (Cl. 340—172.5)

This invention relates to a system for comparing and sorting character data and, more particularly, to a data handling apparatus for directing character data that is stored in two record blocks to appropriate high and low lines as determined by the relative magnitudes of the character data.

The two-way data compare-sort apparatus of the present invention is a basic element of the type out of which sorting apparatus adapted to sort three or more character data may be composed. For example, sorting apparatus composed of basic elements of the disclosed type that is adapted to simultaneously arrange six character data in a predetermined ordered sequence as defined by the relative magnitudes of the character data is disclosed in copending application for patent entitled: Minimal Storage Sorter, Philip N. Armstrong, inventor, Serial No. 771,482, filed November 3, 1958, which application is assigned to the same assignee as is the present case. In particular, the apparatus disclosed in the Armstrong application for simultaneously arranging six character data is composed of twelve two-way data compare-sort units of the type herewith disclosed. As is evidenced in this apparatus, it is essential that several of the two-way data compare-sort units of the present invention be used in cascade. That is, it is often necessary to use two or more of the two-way data compare-sort units in cascade to simultaneously arrange a plurality of character data. In order to effect a single compare-sort operation, present day two-way data compare-sort apparatus generally require a plurality of clock signals within each bit interval thereby deteriorating the output signals to the extent that retiming of each signal between each successive pair of units in cascade becomes necessary. In a complex sorting apparatus this requires the introduction of substantial amounts of additional circuitry.

It is therefore an object of the present invention to provide an improved two-way data compare-sort apparatus.

Another object of the present invention is to provide a two-way data compare-sort apparatus which operates with only the delay that is inherent in the components constituting the apparatus.

Still another object of the present invention is to provide a two-way data compare-sort apparatus which requires only a single clock pulse within each bit interval.

A further object of the present invention is to provide a two-way data compare-sort apparatus adapted to direct two character data to appropriate high and low lines as defined by the relative magnitude of predetermined initial portions of the character data.

A still further object of the present invention is to provide a two-way data compare-sort apparatus adapted to utilize "Nor" and "Nand" logic in a manner which eliminates the necessity of complementary signals.

In general, the devices of the present invention represent particular embodiments of the invention disclosed in copending application for patent entitled: Two-Way Data Compare-Sort Apparatus, Philip N. Armstrong et al., inventor, Serial No. 777,551, filed November 28, 1958. According to the present invention, first and second character data signals are gated and inverted through first and second gates, respectively, which may either be of the "Nor" or "Nand" type, and the output signals therefrom combined through a single gate of the same type as that chosen and applied to a high or "Hi" output terminal. Secondly, third and fourth character data signals are gated and inverted through third and fourth gates, respectively, which, again, may be either of the "Nor" or "Nand" type and the output signals therefrom combined through a signal gate of the same type as that chosen therefor and applied to a low or "Lo" output terminal. In this second instance, however, the third and fourth character data signals may be either the same or complementary to the first and second signals, respectively. In the case where the signals are the same, it is necessary that the third and fourth gates be of a type opposite from that of the first and second gates. On the other hand, where the third and fourth character data signals are complementary to the first and second character data signals, respectively, the third and fourth gates are the same type as are the first and second gates. That is, the first, second, third and fourth gates are either all of the "Nor" type or all of the "Nand" type.

Lastly, the passage of the aforementioned character data signals through the first, second, third and fourth gates is controlled by the output signals from an inhibit flip-flop and an exchange flip-flop. In accordance with the present invention, the character data signals are allowed to pass through all of the first, second, third and fourth gates so long as the first and second and third and fourth signals are of the same level. That is, the signals of each pair are either at the information level or at the zero level. Also, if the level of one character data signal is higher than its associated signal, the signals will continue to pass through the respective gates with no delay except that which is inherent in the parameters of the gating circuitry. Nearer the latter portion of this bit interval, however, this latter condition is detected and the appropriate inhibit or exchange flip-flop is set, thereby to "latch-connect" the individual character data signals to appropriate "Hi" or "Lo" lines as the case dictates.

It is sometimes desired to direct character data signals to the "Hi" and "Lo" lines in accordance with the relative magnitudes of predetermined initial portions thereof. These predetermined initial portions are referred to as the control numbers of the character data. In the present device, character data is arranged in accordance with control numbers by employing either a control signal or its complement to set the inhibit flip-flop during the last bit of the control number if an exchange has not and is not going to be made during the last bit interval.

The above-mentioned and other features and objects of this invention and the manner of obtaining them will become more apparent by reference to the following description taken in conjunction with the accompanying drawings, wherein.

Figure 1:
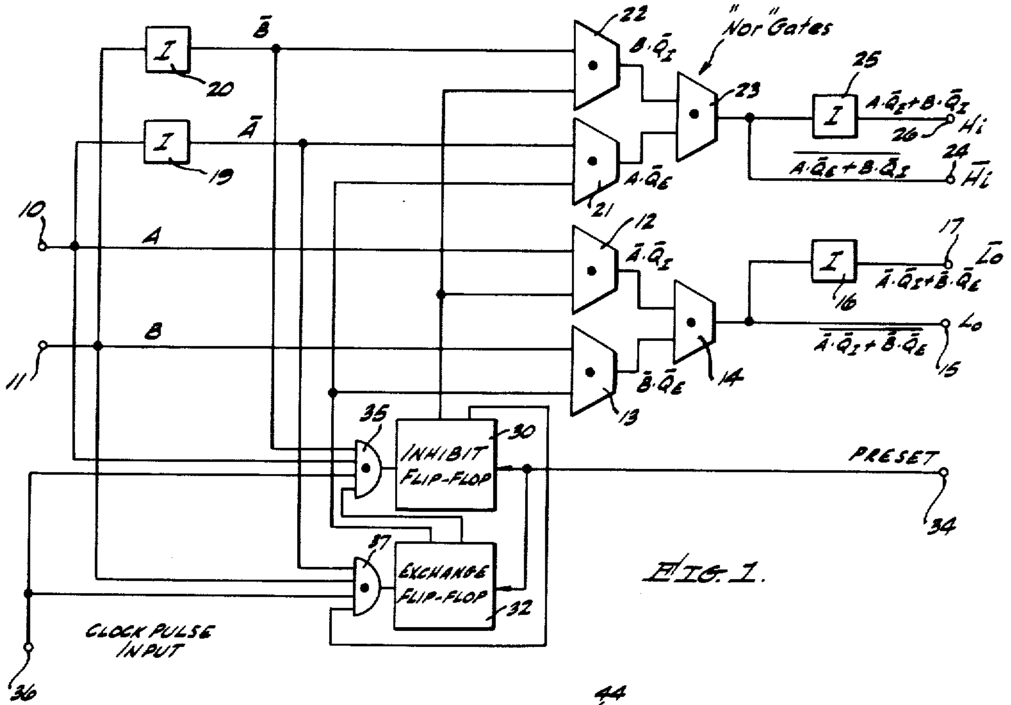
Figs. 1–3 illustrate schematic block diagrams of preferred embodiments of the invention.

In describing the apparatus of the present invention, a convention is employed wherein individual "and" and "or" gates are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level, i.e., the output signal is the "conjunction" of the input signals. An "or" gate, on the other hand, produces an information level output signal when any one of the input signals thereto is at the information level, i.e., the output signal is the "alternation" of the input signals.

Also, in addition to the above, a convention is employed wherein individual "Nor" and "Nand" gates are shown as isosceles trapezoids with the inputs applied to the longer side, and the output appearing on the shorter side. A "Nand" gate is indicated by a (+) and a "Nor" gate by a (·) disposed within the isosceles trapezoidal blocks. As is generally known, a "Nor" gate produces a signal representative of the conjunction of the negations or complements of the input signals or, expressed differently, the negation or complement of the alternations of the input signals. The "Nand" gate, on the other hand, produces a signal at its output representative of the alternation of the negations or complements of the input signals thereto.

A further convention is employed in describing the particular embodiments of the present invention wherein the left and right sides of the rectangles representing flip-flops, as they appear in the drawings, are designated as the set and reset inputs, respectively. Further, the principal and complementary output terminals from the flip-flop emanate from the left and right portion of the top line of the rectangle, respectively. An information level signal applied to either the set or reset inputs of a flip-flop will change its state in a manner such that an information level signal will appear at the corresponding principal or complementary output terminal. Lastly, it is considered within the present state of the computer art that flip-flops may be employed which possess an "and" gate at its set and reset inputs, which "and" gate is an integral part of its circuit. In the following description, an "and" gate will be shown separately from the associated flip-flop in order to more clearly describe the apparatus of the present invention.

An example of an illustrative and preferred embodiment of the device of the present invention employing what is known as "Nor" logic is shown in Fig. 1. Referring to Fig. 1, a two-way data compare-sort apparatus receives first and second input signals A, B at terminals 10, 11, respectively. In order to effect sorting, it is necessary that these input signals A, B constitute binary words arranged with the most significant bits first. The terminals 10, 11 are connected through "Nor" gates 12, 13, respectively, to the inputs of an additional "Nor" gate 14, the output of which is connected to a Lo output terminal 15. A complementary Lo output, $\overline{\text{Lo}}$, may be provided by connecting the output of "Nor" gate 14 through an inverter 16 to a $\overline{\text{Lo}}$ output terminal 17. Next, the terminals 10, 11 are connected through inverters 19, 20, respectively, to the inputs of "Nor" gates 21, 22, the outputs of which are connected through an additional "Nor" gate 23 to a complementary Hi or $\overline{\text{Hi}}$ output terminal 24. A high output is then provided by connecting the output of "Nor" gate 23 through an inverter 25 to a Hi output terminal 26.

In addition to the above, the two-way data compare-sort apparatus includes an inhibit flip-flop 30 and an exchange flip-flop 32. Both the inhibit and exchange flip-flops 30, 32 have reset inputs which are coupled to a preset input terminal 34 to which record count pulses are applied prior to the commencement of each record block in a manner hereinafter explained. The set input to the inhibit flip-flop 30 is connected to the output of an "and" gate 35 which, in turn, has inputs connected to terminal 10, the output of the inverter 20, the complementary output of exchange flip-flop 32 and a clock pulse input terminal 36 thereby to receive signals A, $\bar{B}$, $\bar{Q}_E$, and clock pulses, respectively. The set input of the exchange flip-flop 32, on the other hand, is connected to the output of an "and" gate 37 which has inputs connected to terminal 11, the output of inverter 19 which is connected to terminal 10, the clock pulse input terminal 36 and to the complementary output of inhibit flip-flop 30 thereby to receive input signals B, $\bar{A}$, clock pulses and $\bar{Q}_I$, respectively. Lastly, the principal output of inhibit flip-flop 30 is connected to inputs of "Nor" gates 12 and 22, and the principal output from the exchange flip-flop 32 is connected to inputs of "Nor" gates 13, 21.

Figure 4:
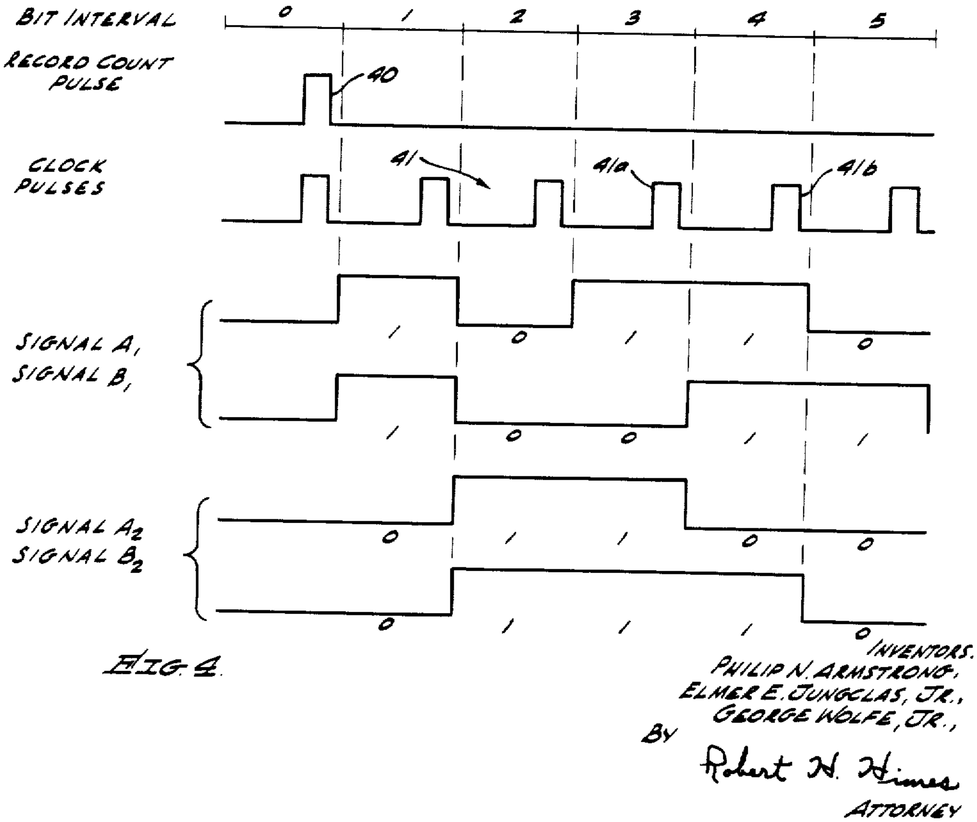
Fig. 4 shows timing signals which are applicable to the apparatus of Figs. 1–3.

In order to explain more clearly the operation of the two-way data compare-sort apparatus of Fig. 1, reference is made to the timing signal chart of Fig. 4 which illustrates only the first five bit intervals of a record block, by way of example. In a typical case an entire record block might include, for example, as many as four hundred eighty bit intervals or "bits."

Referring to Fig. 4, a record count pulse 40 is produced and applied to preset input terminal 34 prior to the commencement of each record block. The record count pulse 40 is, for reference purposes, shown as occurring in bit interval "0." A clock pulse signal 41, on the other hand, constitutes a series of pulses which occur in the latter portion of each bit interval. In actual practice, the record count pulse 40 and the clock pulse preferably commence at the same time and are of the same configuration within the interval in which they both occur. In operation, the record count pulses 40 are applied through the preset input terminal 34 to the reset inputs of the inhibit and exchange flip-flops 30, 32, whereby the respective complementary output signals $\bar{Q}_I$, $\bar{Q}_E$ both constitute information level voltages and the principal output signals $Q_I$, $Q_E$ constitute zero level signals. Thus, all the inputs to the "Nor" gates 12, 13, 21 and 22 from the inhibit and exchange flip-flops 30, 32 initially have a zero level signal applied thereto. Thus, in that as previously defined, a "Nor" gate produces the conjunction of the negations of the input signals thereto, it is evident that the negations or inversions of the signals applied to terminals 10, 11 are produced at the output of "Nor" gates 12, 13 so long as the signals A, B are identical. These negations of the signals A, B are, in turn, applied to inputs of the "Nor" gate 14 where they are again inverted and appear at the output thereof in the same form as the original signals A, B. As specified above, the output of "Nor" gate 14 is connected to the Lo output terminal 15. In logical form it may be shown that the signal appearing at terminal 15 may be represented as $\overline{\bar{A}\cdot\bar{Q}_I+\bar{B}\cdot\bar{Q}_E}$. The complementary Lo output is provided by inverting the signal appearing at the output of "Nor" gate 14 by means of the inverter 16, the output of which is connected to the $\overline{\text{Lo}}$ output terminal 17. In logical form the $\overline{\text{Lo}}$ output signal may be represented as $(\bar{A}\cdot\bar{Q}_I+\bar{B}\cdot\bar{Q}_E)$. Similarly, as long as the signals A, B are identical, the negations of the complements thereof are produced at the outputs of the "Nor" gates 21, 22. These signals are, in turn, applied to the inputs of the "Nor" gate 23, the output of which is inverted by the inverter 25 and applied to the Hi output terminal 26. In logical form the signals appearing at Hi output terminal 26 may be represented as $(A\cdot\bar{Q}_E+B\cdot\bar{Q}_I)$. As previously specified, the $\overline{\text{Hi}}$ output terminal is connected directly to the output of "Nor" gate 23. In logical form the signal appearing at this output may be represented as $\overline{(A\cdot\bar{Q}_E+B\cdot\bar{Q}_I)}$. In the aforementioned description, it is to be noted that the signals A, B have been the same and that the signals $\bar{Q}_I$, $\bar{Q}_E$ have remained at the information level.

Consider now signals $A_1$, $B_1$ of Fig. 4 and, in particular, bit interval 3 wherein the signal $A_1$ applied to terminal 10 is at the information level and signal $B_1$ applied to terminal 11 is at the zero level. In that the inverter 20 connected to terminal 11 will produce an information level signal in response to a zero level input, the three inputs to "and" gate 35, exclusive of the clock pulse input, namely, the signal $A_1$ applied to terminal 10, the signal $\bar{B}_1$ which is the complement of the signal applied to terminal 11, and the complementary output signal $\bar{Q}_E$ from exchange flip-flop 32 are all at the information level thereby allowing the clock pulse 41a in bit interval 3 to set the inhibit flip-flop 30. The setting of the inhibit flip-flop 30 produces an information level signal at the input of "Nor" gates 12, 22, and, in addition, removes the information level signal from one of the inputs of "and" gate 37, thus preventing any subsequent setting of exchange flip-flop 32 within the remainder of the record block. In that the output of the "Nor" gates 12, 22 is the conjunction of the negations of the input, an information level signal input thereto will prevent any further signal from passing through these gates. Thus, the signal $A_1$ applied to terminal 10 is connected through inverter 19, "Nor" gate 21, "Nor" gate 23, and inverter 25 to the Hi output terminal 26 for the remainder of the record block. Similarly, the signal $B_1$ applied to terminal 11 is connected through "Nor" gate 13 and "Nor" gate 14 to Lo output terminal 15 for the remainder of the record block.

In the foregoing operation, it is noted that from the commencement of the bit interval wherein the signals had different levels the Hi output signal available at terminal 26 commences and remains at the information level and the Lo output signal appearing at terminal 15 commences and remains at the zero level throughout the bit interval. The clock pulse applied to "and" gates 35, 37 serves to sample the signals A, B during each bit interval and detects when an existing state exists wherein one of the signals is at the information level and the other at the zero level and accordingly effect the "latch-connecting" of the appropriate terminals 10, 11 to the Hi and Lo output terminals 15, 26 by the setting of either the inhibit flip-flop 30 or the exchange flip-flop 32.

Alternative to the above situation, consider the operation of the two-way data compare-sort apparatus of Fig. 1 with the signals $A_2$, $B_2$ applied to terminals 10, 11, respectively, during bit interval 4 when the signals for the first time during the record block differ in level, the signal $B_2$ applied to terminal 11 being at the information level and the signal $A_2$ applied to terminal 10 being at the zero level. In that there have been no prior differences in level between the signals $A_2$, $B_2$ during bit intervals 1–3, it is apparent that the complementary output signal $\bar{Q}_I$ from inhibit flip-flop 30, the signal $\bar{A}_2$ which is the complement of the signal at terminal 10, and the signal $B_2$ at terminal 11, which signals are applied to the inputs of "and" gate 37, will all be at the information level thereby allowing clock pulse 41b, which occurs during bit 4, to set the exchange flip-flop 32. Setting of the exchange flip-flop 32 removes the $\bar{Q}_E$ signal from the input of "and" gate 35 thereby preventing any subsequent changes of state by the inhibit flip-flop 30 during the remainder of the record block. In addition, setting of the exchange flip-flop 32 applies an information level signal to "Nor" gates 13, 21, whereby, commencing with bit interval 5, the output signals therefrom, which are the conjunction of the negations of the input signals, remain at zero level for the remainder of the record block. Thus, in this instance terminal 10 is "latch-connected" through "Nor" gates 12 and 14 to the Lo output terminal 15, and terminal 11 is "latch-connected" through inverter 20, "Nor" gates 22 and 23 and inverter 25 to Hi output terminal 26 for the remainder of the record block.

Figure 2:
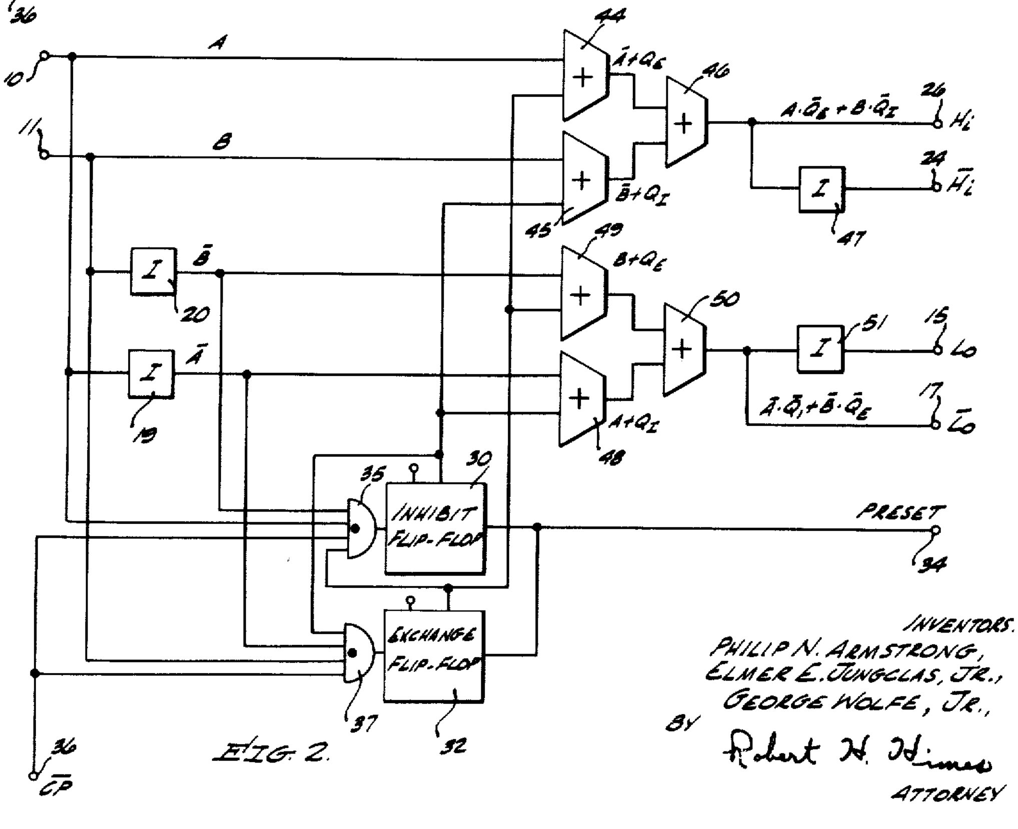

An alternative embodiment of the device of the present invention employing "Nand" logic is shown in Fig. 2. Referring to Fig. 2, there is shown a two-way data compare-sort apparatus that includes input terminals 10, 11, inverters 19, 20 and inhibit and exchange flip-flops 30, 32 with associated "and" gates 35, 37, all of which have their input connections connected in the same manner as in the device described in connection with Fig. 1. In the case of the device of Fig. 2, however, the input terminals 10, 11 are connected through "Nand" gates 44, 45 to the inputs of an additional "Nand" gate 46, the output of which in turn is connected directly to the Hi output terminal 26. The complementary Hi or $\overline{\text{Hi}}$ output terminal 24 is then connected through an inverter 47 to the output of "Nand" gate 46. In addition, the outputs of inverters 19, 20 are connected, respectively, to the inputs of "Nand" gates 48, 49, the outputs of which are connected through an additional "Nand" gate 50 to the complementary Lo or $\overline{\text{Lo}}$ terminal 17. The Lo output is provided by connecting an inverter 51 from the output of "Nand" gate 50 to the Lo output terminal 15.

As before, gating through the "Nand" gates 44, 45, 48, 49 is controlled by the output signals from inhibit and exchange flip-flops 30, 32. In particular, the complementary output from inhibit flip-flop 30 is connected to inputs of "Nand" gates 45, 48, and the complementary output from exchange flip-flop 32 is connected to inputs of "Nand" gates 44, 49.

In operation, the signals A and $\bar{Q}_E$ are applied to the inputs of "Nand" gate 44, whereby a signal representative of the alternation of the negations is produced at the output thereof, i.e., the signal $(\bar{A}+Q_E)$ is produced at the output of "Nand" gate 44. Similarly, signals B and $\bar{Q}_I$ are applied to the inputs of "Nand" gate 45 thereby to produce a signal representative of $(\bar{B}+Q_I)$ at the output thereof. The output signals of "Nand" gates 44, 45, namely $(\bar{A}+Q_E)$ and $(\bar{B}+Q_I)$ are in turn applied to the inputs of the additional "Nand" gate 46 to produce a signal representative of $(A\cdot\bar{Q}_E+B\cdot\bar{Q}_I)$ at the Hi output terminal 26, which signal is identical to that of the device of Fig. 1.

Referring now to the Lo and $\overline{\text{Lo}}$ output terminals 15, 17, the signals $\bar{B}$ and $\bar{Q}_E$ are applied to the inputs of "Nand" gate 49, thereby to produce the signal $(B+Q_E)$ at the output thereof. Similarly, signals $\bar{A}$ and $\bar{Q}_I$ are applied to the inputs of "Nand" gate 43 to produce the signal $(A+Q_I)$ at its output. The signals appearing at the outputs of "Nand" gates 49, 48, that is signals $(B+Q_E)$ and $(A+Q_I)$, are applied to the inputs of "Nand" gate 50, to produce the signal representative of $(\bar{A}\cdot\bar{Q}_I+\bar{B}\cdot\bar{Q}_E)$, which signal is applied to $\overline{\text{Lo}}$ output terminal 17. As in the case of the Hi output terminal 26, the signal generated at $\overline{\text{Lo}}$ output terminal 17 is identical to that produced by the device of Fig. 1. The Lo output signal is provided by inverting the signal appearing at the output of "Nand" gate 50 by means of the inverter 51, the output of which is applied to Lo output terminal 15.

Figure 3:
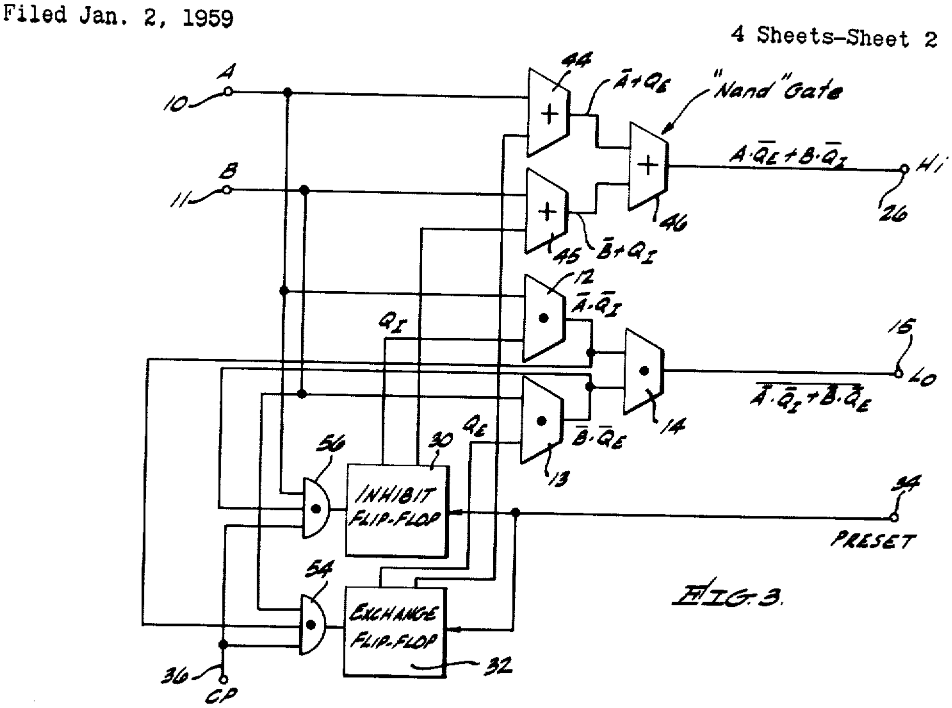

Referring now to Fig. 3, there is shown an embodiment of the invention which combines the use of both "Nor" and "Nand" logic in a manner to eliminate the necessity of producing the complementary Hi and Lo output signals, i.e., the signals produced at terminals 17 and 24. In particular, input terminals 10, 11 are connected to "Nand" gates 44, 45, respectively, and the outputs therefrom are, in turn, connected through the additional "Nand" gate 46 to the Hi output terminal 26. Similarly, terminals 10, 11 are connected to the inputs of "Nor" gates 12, 13 and the outputs therefrom connected through the additional "Nor" gate 14 to the Lo output terminal 15. As before, the two-way data compare-sort apparatus of Fig. 3 includes the inhibit flip-flop 30 and the exchange flip-flop 32. The reset inputs of the inhibit and exchange flip-flops 30, 32 are connected to preset input terminal 34 so that both the flip-flops will be reset by the record count pulse 40 which occurs prior to the commencement of each record block. As in the case of the devices of Figs. 1 and 2, it is desired to set the exchange flip-flop 32 when the signal B is for the first time within a record block at the information level and the signal A is at the zero level. In this case, this may be accomplished by connecting the set input of exchange flip-flop 32 to the output of an "and" gate 54 which has inputs connected to terminal 11, to the output of "Nor" gate 12 and to the clock pulse input terminal 36, thereby to detect when the signals B, $\bar{A}$, $\bar{Q}_I$ and clock pulses are all at the information level. Also, as before, it is desired to set the inhibit flip-flop 30 when the signal A is at the information level and the signal B is at the zero level. This is accomplished by connecting the set input of flip-flop 30 to the output of an "and" gate 56 which, in turn, has inputs connected to terminal 10, the output of "Nor" gate 13 and to clock pulse input terminal 36, thereby to detect when signals A, $\bar{B}$, $\bar{Q}_E$ and clock pulses are all at the information level. When all the signals applied to either of the "and" gates 54 or 56 are at the information level, the respective flip-flop 30 or 32 is set.

The output signal from the inhibit and exchange flip-flops 30, 32, as before, are employed to control the flow of the signals applied to terminals 10, 11 through "Nand" gates 44, 45 and "Nor" gates 12, 13 to the appropriate Hi output terminal 26 or Lo output terminal 15. Thus, as in the device of Fig. 2, "Nand" gate 44 has an input connected to the complementary output of exchange flip-flop 32, and "Nand" gate 45 has an input connected to the complementary output of inhibit flip-flop 30. In that this produces signals at the inputs of "Nand" gate 46 and at Hi output terminal 26 that is the same as in the device of Fig. 2, i.e. $(A\cdot\bar{Q}_E+B\cdot\bar{Q}_I)$, further explanation of the gating to Hi output terminal 26 will not be repeated. Also, as in the case of the device of Fig. 1, "Nor" gate 12 has an input connected to the principal output of inhibit flip-flop 30, and "Nor" gate 13 has an input connected to the principal output of exchange flip-flop 32. In that the inputs to the "Nor" gates 12, 13 and 14 are identical to what they are in the device of Fig. 1, the explanation of the manner in which the Lo output signal is produced will not be repeated. It is apparent, however, that since no complementary signals are required either in formulating the initial logic or in setting the inhibit or exchange flip-flops 30, 32 it is no longer necessary to produce the complementary Hi and Lo output signals available at terminals 34, 17 as was done in the devices of Figs. 1 and 2.

Figure 5:
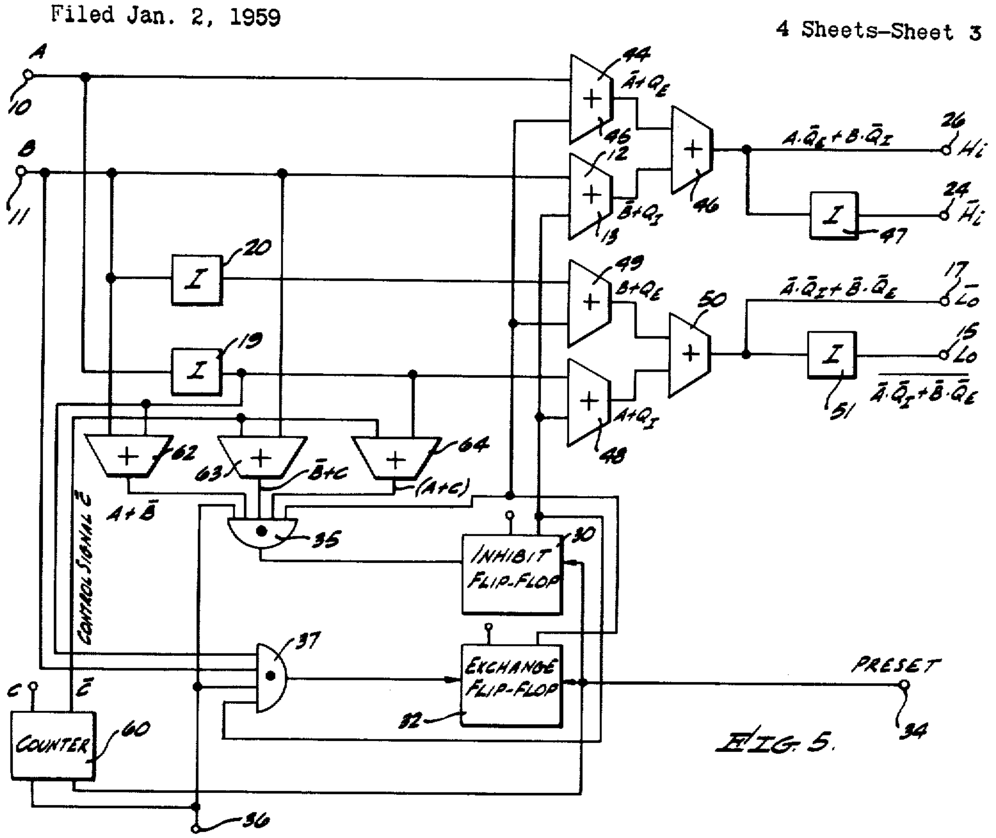
Figs. 5 and 6 illustrate embodiments of the invention adapted to arrange character data in accordance with a control number.
Figure 7:
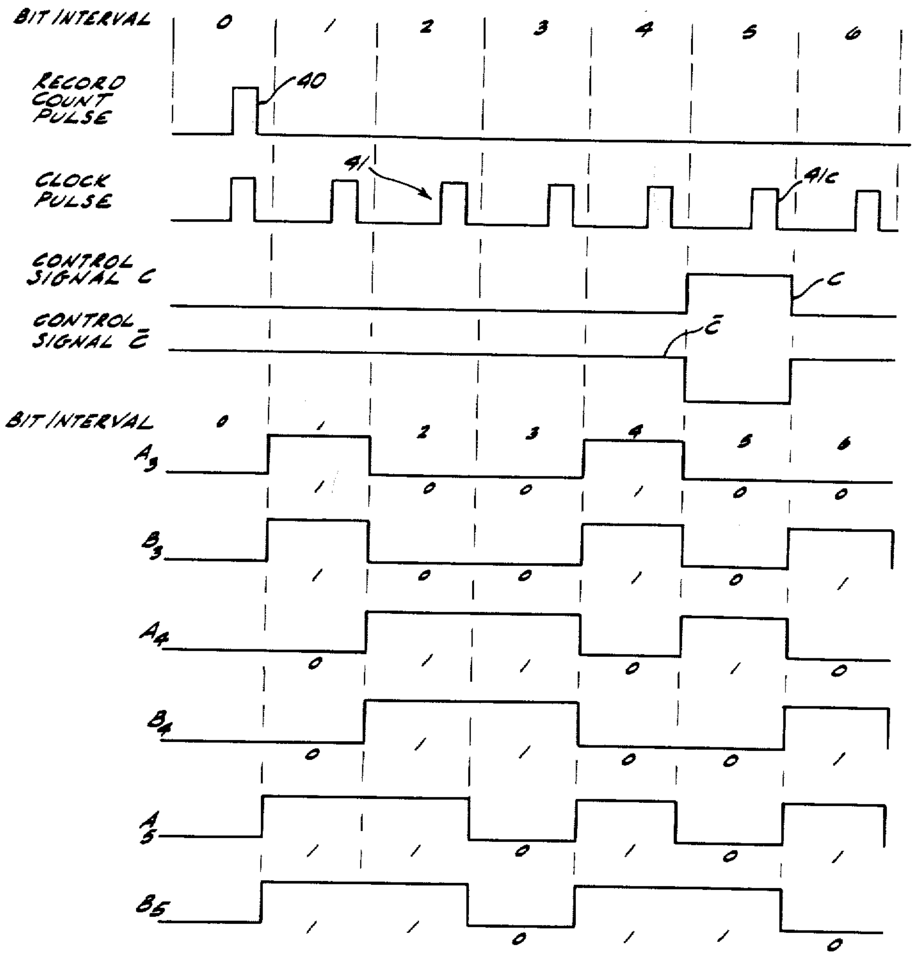
Fig. 7 shows timing signals which are applicable to the apparatus of Figs. 5 and 6.

It is sometimes desirable to perform sorting in accordance with the magnitude of only a predetermined initial portion with each character data. As previously specified, this "initial portion" of the character data is referred to as a control number. Referring now to Fig. 5, there is illustrated the two-way data compare-sort apparatus shown in Fig. 2 modified in a manner to sort on the basis of a control number having five bits by way of example. The modifications comprise modifying the inputs to the "and" gate 35 in a manner such that the inhibit flip-flop 30 will be set during the last bit interval of the control number if an exchange has not and is not going to be made prior to or during this bit interval. In the present instance, this is accomplished by first producing a control signal C, which signal remains at the zero level until the last bit interval of the control number which, in the present example, is bit interval 5. It is also desirable to produce the complement or negation of control signal C. The waveforms for the control signal C, together with its complement, $\bar{C}$, are shown in Figure 7, which figure illustrates the time relationship between the control signal C and the clock pulses 41. The control signal C and its complement may be produced by a counter 60 which has a reset input connected to preset input terminal 34 and a set input connected to clock pulse input terminal 36 whereby the counter is reset to zero at the commencement of each record block. The counter 60 includes appropriate gating responsive to selected principal and complementary outputs of flip-flops which comprise the counter to produce the control signal C together with its complement, $\bar{C}$.

In order to set the inhibit flip-flop 30 during the last bit interval of the number, as described above, the inputs to "and" gate 35 are made responsive to the clock pulse signal 41 and the signals $(A+\bar{B})$, $(\bar{B}+C)$, $(A+C)$ and $\bar{Q}_E$. In the present case, the signal $(A+\bar{B})$ is instrumented by means of a "Nand" gate 62 having inputs connected to terminal 11 and the output of inverter 19 thereby to be responsive to the signals B and $\bar{A}$, respectively. Next, the signal $(\bar{B}+C)$ is instrumented by a "Nand" gate 63 which has inputs connected to the complementary output of counter 60 and terminal 11 thereby to be responsive to the complement of the control signal C, i.e., signal $\bar{C}$, and the signal B. Lastly, the signal $(A+C)$ is provided by a "Nand" gate 64 which has inputs connected to the complementary output of counter 60 and the output of inverter 19 thereby to be responsive to the signals $\bar{C}$ and $\bar{A}$, respectively. The output of the "Nand" gates 62, 63 and 64 are applied to respective inputs of "and" gate 35 along with the clock pulse signal 41 available at terminal 36 and the signal $\bar{Q}_E$ available at the complementary output of exchange flip-flop 32.

Referring to Fig. 7, there is shown three possible signal variations: namely, signals $A_3$, $B_3$; $A_4$, $B_4$; and $A_5$, $B_5$, to illustrate the operation of the two-way data compare-sort apparatus of Fig. 5. In that a control number is selected which covers the first five bit intervals of the record block, the counter 60 is adapted to produce a signal C which remains at the zero level during bit intervals 1–4 and rises to the information level during bit interval 5, the last bit of the control number. As mentioned above, it is immaterial whether the control signal C remains at the information level or returns to the zero level during bit interval 6 and during the remainder of the record block.

Signals $A_3$, $B_3$ of Fig. 7 illustrate a first possibility wherein both signals remain the same throughout the entire five bit intervals of the control number. It is apparent that the inhibit flip-flop 30 will not be set during the first four bits of the control number, since the signal C will remain at the zero level during intervals 1–4, and either of the signals A or $\bar{B}$ will be at the zero level thus preventing an information level signal from being developed at the output of "and" gate 35. During bit interval 5, however, the control signal C is at the information level. Also, in that it is specified that the signals A and $\bar{B}$ are of the same level during this bit interval, it is apparent that either signal A or signal $\bar{B}$ will be at the information level. Thus, all of the signals applied to the inputs of the "and" gate 35 will be at the information level during bit interval 5 thereby enabling the clock pulse 41*c* to set the inhibit flip-flop 30 whereby the terminal 10 is "latch-connected" through to terminal 26, and terminal 11 "latch-connected" to terminal 15 for the remainder of the record block.

Consider now signals $A_4$, $B_4$ which illustrate another possibility wherein both signals represent the same binary numbers during bit intervals 1–4, but during bit interval 5 signal $A_4$ represents binary 1 and signal $B_4$ represents binary 0. Thus, in this case the signal $A_4$ is greater than the signal $B_4$ during the last bit interval of the control number whereby it is again desired to "latch-connect" the terminal 10 through to the Hi output terminal 26 and input terminal 11 through to Lo output terminal 15. Since the control signal C and signal A are at the information level during bit interval 5, it is evident that all of the signals applied to the inputs of "and" gate 35 will be at the information level, thus enabling clock pulse 41*c* to set the inhibit flip-flop 30, as before.

Next consider signals $A_5$, $B_5$ which illustrate the remaining possibility, namely, signals that are identical during bit intervals 1–4 and signal $B_5$ greater than $A_5$ during bit interval 5. In that $B_5$ is for the first time greater than signal $A_5$ during the last bit interval of the control number, it is desired in this case that terminal 11 to which signal $B_5$ is applied be "latch-connected" through to Hi output terminal 26, and terminal 10 to which signal $A_5$ is applied be "latch-connected" through to Lo output terminal 15 during the remainder of the record block. In this case it is noted that both signals $A_5$ and $\bar{B}_5$ are at the zero level whereby the output of "Nand" gate 62 is at the zero level. This zero level signal applied to an input of "and" gate 35 prevents the clock pulse 41c from setting the inhibit flip-flop 30 during bit interval 5 as in the prior two cases. The signals $\bar{Q}_I$, $B_5$ and $\bar{A}_5$ applied to the inputs of "and" gate 37, however, are all at the information level thereby enabling clock pulse 41c to produce an information level signal at the output of "and" gate 37 thus setting the exchange flip-flop 32. The setting of exchange flip-flop 32 "latch-connects" the input terminals 10, 11 through to the Lo output terminal 15 and Hi output terminal 25, respectively, in the manner explained in connection with the description of the two-way data compare-sort apparatus of Fig. 2.

Figure 6:
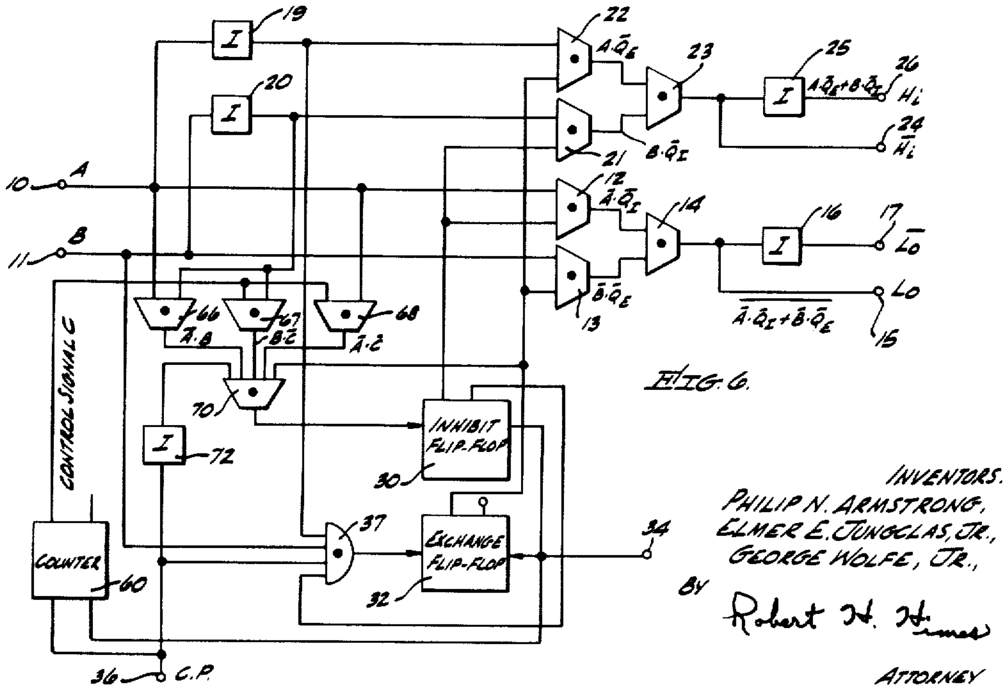

Referring now to Fig. 6, there is illustrated the two-way data compare-sort apparatus described in connection with Fig. 1 modified in a manner to sort in accordance with a control number. In this case, the counter 60 has a reset input connected to preset input terminal 34 and a set input connected to clock pulse input terminal 36, as was done in the apparatus described in connection with Fig. 5. In this instance, however, "Nor" gates 66, 67, 68 replace the "Nand" gates 62, 63, 64, respectively, and an additional "Nor" gate 70 replaces the "and" gate 35. In particular, the "Nor" gate 66 has inputs connected to the terminal 10 and the output of inverter 20 thereby to apply the signals A and $\bar{B}$ to produce the signal $(\bar{A}\cdot B)$ at its output. Next, the "Nor" gate 67 has inputs connected to the principal output of counter 60 and to the output of inverter 20 to apply signals C and $\bar{B}$, respectively, thereto to produce an output signal representative of $(B\cdot\bar{C})$. Lastly, "Nor" gate 68 has inputs connected to the principal output of counter 60 and to input terminal 10 to apply control signal C and signal A thereto, thereby to produce the signal $(\bar{A}\cdot\bar{C})$ at the output thereof. The outputs from the "Nor" gates 66, 67, 68, together with the principal output from exchange flip-flop 32 and the output from an inverter 72 connected to the clock pulse input terminal 36 are applied to respective inputs of the "Nor" gate 70, the output of which is connected to the set input of inhibit flip-flop 30. As previously defined, a "Nor" gate produces an output signal representative of the conjunction of the negations of the input signals thereto. Thus, it is evident that the "Nor" gate 70 produces a signal representative of the conjunction of the signals $(A+\bar{B})$, $(\bar{B}+C)$, $(A+C)$ and $\bar{Q}_E$, thereby enabling the clock pulse 41c to set the inhibit flip-flop 30 when all of these signals are at the information level in the same manner as with the "and" gate 35 in the apparatus of Fig. 5.

It is to be noted in the two-way data compare-sort apparatus described in connection with Figs. 5 and 6, that the "Nand" gates 62—64 and "Nor" gates 66—68 can be replaced with equivalent "or" or "and" gates, respectively; that is, "Nand" gates 62—64 could be replaced with "or" gates in which case the negations of the input signals applied to the "Nand" gates would be applied to the corresponding "or" gates. Further, the "Nor" gates 66—68 could be replaced with "and" gates in which case the negations of the input signals applied to the respective "Nor" gates 66—68 would be applied to the corresponding "and" gate. It is apparent that substitutions of this type are within the spirit and scope of the teachings of the present application for patent.

What is claimed is:

1. A digital computer apparatus comprising first and second input terminals adapted to be coupled, respectively, to first and second character data signals having corresponding numbers of bits; third and fourth input terminals adapted to be coupled, respectively, to third and fourth character data signals, said third and fourth character data signals being complementary, respectively, to said first and second character data signals; first and second "Nor" gates each having an input connected, respectively, to said first and second input terminals; a third "Nor" gate having inputs connected to the outputs of said first and second "Nor" gates; fourth and fifth "Nor" gates each having an input connected, respectively, to said third and fourth input terminals; a sixth "Nor" gate having inputs connected to the outputs of said fourth and fifth "Nor" gates; means for sampling said character data signals for generating a voltage indication at a first terminal when said first signal is for the first time greater than and different from said second signal and for generating a voltage indication at a second terminal when said second signal is for the first time greater than and different from said first signal; and means having inputs connected to said first and second terminals for generating in response to the appearance of a voltage indication at said first terminal a bi-level control signal at inputs of said first and fifth "Nor" gates and for generating in response to the appearance of a voltage indication at said second terminal a bi-level control signal at inputs of said second and fourth "Nor" gates thereby to "latch-connect" the input terminal to which the lesser of said first and second signals is applied through to said third "Nor" gate and the input terminal to which the lesser of said third and fourth signals is applied through to said sixth "Nor" gate.

2. The digital computer apparatus as defined in claim 1 which additionally includes an inverter having an input coupled to the output of said sixth "Nor" gate thereby to provide an output signal representative of the greater of said first and second character data signals as defined by the relative magnitudes of the character data represented.

3. A digital computer apparatus comprising first and second input terminals adapted to be coupled, respectively, to first and second character data signals having corresponding numbers of bits; third and fourth input terminals adapted to be coupled, respectively, to third and fourth character data signals, said third and fourth character data signals being complementary, respectively, to said first and second character data signals; first and second "Nand" gates each having an input connected, respectively, to said first and second input terminals; a third "Nand" gate having inputs connected to the outputs of said first and second "Nand" gates; fourth and fifth "Nand" gates each having an input connected, respectively, to said third and fourth input terminals; a sixth "Nand" gate having inputs connected to the outputs of said fourth and fifth "Nand" gates; means for sampling said character data signals for generating a voltage indication at a first terminal when said first signal is for the first time greater than and different from said second signal and for generating a voltage indication at a second terminal when said second signal is for the first time greater than and different from said first signal; and means having inputs connected to said first and second terminals for generating in response to the appearance of a voltage indication at said first terminal a bi-level control signal at inputs of said second and fourth "Nand" gates and for generating in response to the appearance of a voltage indication at said second terminal a bi-level control signal at inputs of said first and fifth "Nand" gates thereby to "latch-connect" the input terminal to which the greater of said first and second signals is applied through to said third "Nand" gate and the input terminal to which the greater of said third and fourth signals is applied through to said sixth "Nand" gate.

4. The digital computer apparatus as defined in claim 3 which additionally includes an inverter having an input coupled to the output of said sixth "Nand" gate thereby to provide an output signal representative of the lesser of said first and second character data signals as defined by the relative magnitude of the character data represented.

5. A digital computer apparatus comprising first and second input terminals adapted to be coupled, respectively, to first and second character data signals having corresponding numbers of bits; first and second "Nand" gates each having an input connected, respectively, to said first and second input terminals; a third "Nand" gate having inputs connected to the outputs of said first and second "Nand" gates; first and second "Nor" gates each having an input connected, respectively, to said first and second input terminals; a third "Nor" gate having inputs connected to the outputs of said first and second "Nor" gates; means for sampling said character data signals for generating a voltage indication at a first terminal when said first signal is for the first time greater than and different from said second signal and for generating a voltage indication at a second terminal when said second signal is for the first time greater than and different from said first signal; and means having inputs connected to said first and second terminals for generating in response to the appearance of a voltage indication at said first terminal bi-level control signals at the inputs of said first "Nor" gate and said second "Nand" gate and for generating in response to the appearance of a voltage indication at said second terminal bi-level control signals at inputs of said second "Nor" gate and said first "Nand" gate thereby to "latch-connect" the input terminal to which the greater of said first and second signals is applied through to said third "Nand" gate and the input terminal to which the lesser of said first and second signals is applied through to said third "Nor" gate.

6. A two-way data compare-sort apparatus for handling record blocks each of which includes at least one character data having corresponding numbers of bits, said apparatus comprising: first and second input terminals adapted to be coupled, respectively, to first and second record block signals; third and fourth input terminals adapted to be coupled, respectively, to third and fourth record block signals, said third and fourth record block signals including character data that is complementary to character data included in said first and second record block signals, respectively; first and second "Nand" gates each having an input connected, respectively, to said first and second input terminals; a third "Nand" gate having inputs connected to the outputs of said first and second "Nand" gates; fourth and fifth "Nand" gates each having an input connected, respectively, to said third and fourth input terminals; a sixth "Nand" gate having inputs connected to the outputs of said fourth and fifth "Nand" gates; a first flip-flop having set and reset inputs and a complementary output, said complementary output being connected to inputs of said second and fourth "Nand" gates; a second flip-flop having set and reset inputs and a complementary output, said complementary output being connected to inputs of said first and fifth "Nand" gates; means for producing and simultaneously applying a reset pulse to the reset inputs of said first and second flip-flops prior to the commencement of each record block of character data; means for producing periodic clock pulses which occur within each bit interval of the character data included in said record block signals; means for producing an inhibit control signal which signal increases from a zero level to an information level during the last bit interval within a predetermined initial portion of the character data within each record block of said first and second record block signals; first gating means responsive to said second and third record block signals, said clock pulses and the signal available at the complementary output of said first flip-flop and having an output connected to the set input of said second flip-flop for setting said second flip-flop when the character data of said first record block signal is for the first time within concurrent record blocks less than and different from that of said second record block signal; and second gating means responsive to said record block signals, said inhibit control signal and said clock pulses and having an output coupled to the set input of said first flip-flop for setting said first flip-flop when the character data of said first record block signal is for the first time within said predetermined initial portion of concurrent record blocks, greater than and different from that of said second record block signal and for setting said first flip-flop during said last bit interval within said predetermined initial portion when the character data of said first and second record block signals is the same during the entirety of said predetermined initial portions of concurrent record blocks.

7. The two-way data compare-sort apparatus as defined in claim 6 wherein said second gating means includes a seventh "Nand" gate having inputs responsive to said second and third record block signals; an eighth "Nand" gate having inputs responsive to the negation of said inhibit control signal and said second record block signal; a ninth "Nand" gate having inputs responsive to the negation of said inhibit control signal and said third record block signal; and an "and" gate having inputs responsive to said clock pulses, the output signals of said seventh, eighth and ninth "Nand" gates and the signal generated at the complementary output of said second flip-flop and having an output connected to said set input of said flip-flop.

8. A two-way data compare-sort apparatus for handling record blocks each of which includes at least one character data having corresponding numbers of bits, said apparatus comprising: first and second input terminals adapted to be coupled, respectively, to first and second record block signals; third and fourth input terminals adapted to be coupled, respectively, to third and fourth record block signals, said third and fourth record block signals including character data that is complementary to character data included in said first and second record block signals, respectively; first and second "Nor" gates each having an input connected, respectively, to said first and second input terminals; a third "Nor" gate having inputs connected to the outputs of said first and second "Nor" gates; fourth and fifth "Nor" gates each having an input connected, respectively, to said third and fourth input terminals; a sixth "Nor" gate having inputs connected to the outputs of said fourth and fifth "Nor" gates; a first flip-flop having set and reset inputs and a principal and complementary output, said principal output being connected to inputs of said first and fifth "Nor" gates; a second flip-flop having set and reset inputs and a principal and a complementary output, said principal output being connected to inputs of said second and fourth "Nor" gates; means for producing and simultaneously applying a reset pulse to the reset inputs of said first and second flip-flops prior to the commencement of each record block of character data; means for producing periodic clock pulses which occur within each bit interval of the character data included in said record block signals; means for producing an inhibit control signal which signal increases from a zero level to an information level during the last bit interval within a predetermined initial portion of the character data within each record block of said first and second record block signals; first gating means responsive to said second and third record block signals, said clock pulses and the signal available at the complementary output of said first flip-flop and having an output connected to the set input of said second flip-flop for setting said second flip-flop when the character data of said first record block signal is for the first time within concurrent record blocks less than and different from that of said second record block signal; and second gating means responsive to said record block signals said inhibit control signal and said clock pulses and having an output coupled to the set input of said first flip-flop for setting said first flip-flop when the character data of said first record block signal is for the first time within said predetermined initial portion of concurrent record blocks greater than and different from that of said second record block signal and for setting said first flip-flop during said last bit interval within said predetermined initial portion when the character data of said first and second record block signals is the same during the entirety of said predetermined initial portions of concurrent record block.

9. The two-way data compare-sort apparatus as defined in claim 8 wherein said second gating means includes a seventh "Nor" gate having inputs responsive to said first and fourth record block signals; an eighth "Nor" gate having inputs responsive to said inhibit control signal and said fourth record block signal; a ninth "Nor" gate having inputs responsive to said inhibit control signal and said first record block signal; and a tenth "Nor" gate having inputs responsive to the output signals of said seventh, eighth and ninth "Nor" gates, the signal generated at the principal output of said second flip-flop and the negation of said clock pulses and having an output connected to said set input of said first flip-flop.

10. A digital computer apparatus comprising first and second input terminals responsive, respectively, to first and second character data signals having corresponding numbers of bits; means for sampling said character data signals for generating an electrical indication at a first terminal when the level of said first character data signal is for the first time greater than and different from the level of said second character data signal and for generating an electrical indication at a second terminal when the level of said second character data signal is for the first time greater than and different from the level of said first character data signal; means coupled to said first and second terminals for generating a first bi-level control signal, which control signal changes levels in response to the appearance of an electrical indication at said first terminal and for generating a second bi-level control signal, which control signal changes levels in response to the appearance of an electrical indication at said second terminal; and means coupled to said first and second input terminals and responsive to said first and second control signals for producing at a first output terminal an electrical signal representative of the alternation of the conjunction of said first character data signal and said second control signal and the conjunction of said second character data signal and said first control signal and for producing at a second output terminal an electrical signal representative of the negation of the alternation of the conjunction of the complement of said second character data signal and said second control signal and the conjunction of the complement of said first character data signal and said first control signal.

11. A digital computer apparatus comprising first and second input terminals, each being responsive to character data signals designated by A and B, respectively, each of which has the same number of bits; means for sampling said character data signals for generating an electrical indication at a first terminal when the level of said character data signal, A, is for the first time greater than and different from the level of said character data signal, B, and for generating an electrical indication at a second terminal when the level of said character data signal, B, is for the first time greater than and different from the level of said character data signal A; means having set inputs connected to said first and second terminals for generating a first bi-level control signal, which control signal changes levels in response to the appearance of an electrical indication at said first terminal and for generating a second bi-level control signal, which control signal changes levels in response to the appearance of an electrical indication at said second terminal; and means coupled to said first and second input terminals and responsive to said first and second control signals for producing an electrical signal representative of the alternation of $A\cdot$(second control signal) and $B\cdot$(first control signal) at a first output terminal and an electrical signal representative of the alternation of $\overline{\overline{B}\cdot(\text{second control signal}) \text{ and } \overline{A}\cdot(\text{first control signal})}$ at a second output terminal where a (¯) over a signal indicates the complement of the signal and a (·) between one or more signals indicates the conjunction of these signals.

12. A digital computer apparatus comprising first and second input terminals, each being responsive to character data signals designated by A and B, respectively, each of which has the same number of bits; means for sampling said character data signals for generating an electrical indication at a first terminal when the level of said character data signal, A, is for the first time greater than and different from the level of said character data signal, B, and for generating an electrical indication at a second terminal when the level of said character data signal, B, is for the first time greater than and different from the level of said character data signal A; a first bi-stable device having set inputs responsive to said electrical indication at said first terminal for generating principal and complementary output signals, $Q_1$ and $\bar{Q}_1$, respectively; a second bi-stable device having a set input responsive to said electrical indication at said second terminal for generating principal and complementary output signals, $Q_2$ and $\bar{Q}_2$, respectively; and means coupled to said first and second input terminals and to outputs of said first and second bi-stable devices for producing an electrical signal representative of the alternation of $A\cdot\bar{Q}_2$ and $B\cdot\bar{Q}_1$ at a first output terminal and an electrical signal representative of the inverse of the alternation of $\bar{B}\cdot\bar{Q}_2$ and $\bar{A}\cdot\bar{Q}_1$ at a second output terminal wherein $\bar{A}$ and $\bar{B}$ designate the complements of A and B, respectively, and a (·) between one or more signals indicates the conjunction of these signals.

References Cited in the file of this patent

UNITED STATES PATENTS

| | | |
|---|---|---|
| 2,798,216 | Goldberg | July 2, 1957 |
| 2,901,732 | Canning | Aug. 25, 1959 |